O. SONNLECHNER AND J. SCHIDLOVSKY.
APPARATUS FOR MEASURING THE USEFUL LOAD IN SPRING VEHICLES.
APPLICATION FILED DEC. 24, 1921.
1,432,631. Patented Oct. 17, 1922.
2 SHEETS—SHEET 1.
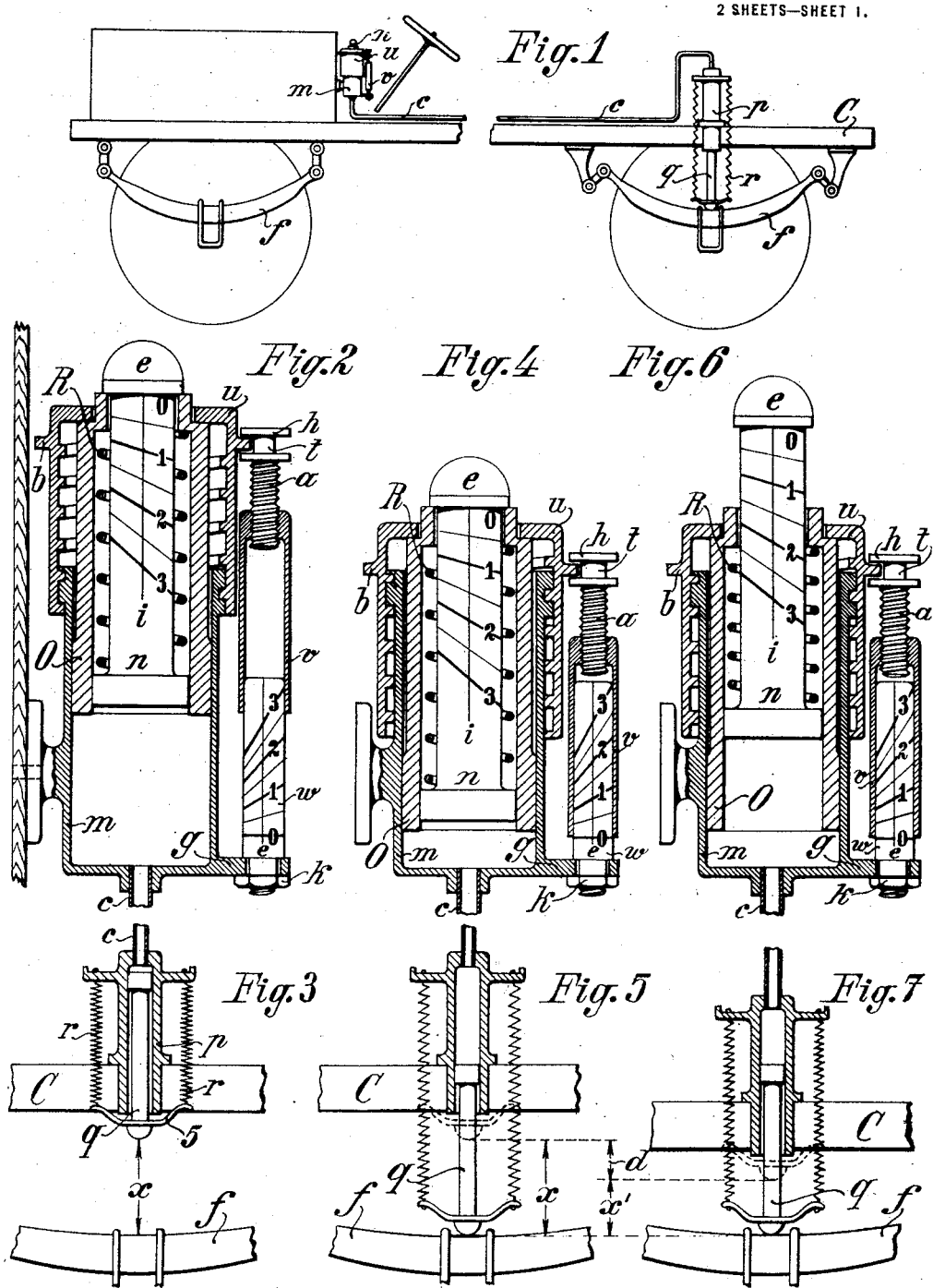
Inventors
O. Sonnlechner
J. Schidlovsky
By Marks & Clerk Attys.

Patented Oct. 17, 1922.

1,432,631

UNITED STATES PATENT OFFICE.

OSKAR SONNLECHNER, OF VIENNA, AUSTRIA, AND JOSEF SCHIDLOVSKY, OF GAGGENAU, GERMANY.

APPARATUS FOR MEASURING THE USEFUL LOAD IN SPRING VEHICLES.

Application filed December 24, 1921. Serial No. 524,791.

*To all whom it may concern:*

Be it known that we, OSKAR SONNLECHNER, citizen of the Republic of Austria, residing at Vienna, Austria, and JOSEF SCHIDLOVSKY, citizen of the Ukrania, residing at Gaggenau, Baden, in Germany, have invented certain new and useful Improvements in Apparatus for Measuring the Useful Load in Spring Vehicles (for which we have applied for a patent in Austria August 4, 1920, and in Germany August 18, 1920), of which the following is a specification.

The present invention relates to appliances for measuring the useful load in spring vehicles, more particularly motor lorries, by means of which the load acting on each, on several or on all of the springs of a vehicle can be measured before and after as well as during the drive.

The arrangement is characterized in this, that each one or each two springs of the vehicle act on a piston, working in a cylinder, which is filled with fluid, is supported on the frame of the vehicle and communicates by a pipe with a measuring apparatus adapted to co-operate with the said cylinder only, or with several such cylinders, the measuring apparatus consisting of a cylinder (the measuring cylinder) and a piston (the measuring piston) working in it and graduated to indicate weights.

On a vehicle spring being flattened by the load, the piston belonging to it is pressed into its cylinder, forces the fluid in the latter through the communicating pipe into the measuring cylinder and thereby causes the measuring piston to be forced out of the measuring cylinder to an extent proportional to the flattening of the spring. As the flattening of the springs, that is, the decrease in each case in the distance between the chassis and the axles is in simple direct proportion, within the permissible loading limits of the springs, to the load in each case and as the distances through which the measuring piston is forced out of the measuring cylinder are also simply and directly proportional to the decrease of the distance from the chassis to the axle, the amounts by which the measuring piston is forced out of the cylinder give in each case a measurement for the load on the spring or springs in question. If a suitable scale is provided on the measuring piston, the load at any time on the spring or springs co-operating with the measuring cylinder can be read off directly. The units according to which the scale of the measuring cylinder is graduated must of course be adapted in each case to the strength of the springs in question. Hence, in order to be able to use the same apparatus for springs of different strength, the scale provided on the measuring piston is not an ordinary linear scale, but a so-called curve scale, in which the graduations are not parallel, but divergent, so that different sized units are obtained along different vertical lines.

The simple arrangement, mentioned above, of a piston, which is actuated by the vehicle spring and is guided in a cylinder fixed to the frame of the vehicle and the connection of this cylinder with the measuring cylinder, provided with a measuring piston has the disadvantage that the pipe and the piston are constantly exposed, when driving, to the violent, dynamic blows of the load, which would in a short time make the whole arrangement useless. This resulted in the further problem of putting the whole measuring appliance out of action when driving. According to the invention this is effected by the pistons actuated by the vehicle springs only touching the said springs when a measurement is being made and being completely withdrawn into their cylinders when in their inoperative position.

For this purpose the said pistons are subject to the action of springs which lift them from the springs of the vehicle, that is, press them into the cylinders. In order, when making a measurement, to press the pistons, which are withdrawn into their cylinders, that is, lifted from the vehicle springs, down again until they touch the springs of the vehicle, besides the measuring piston, a second piston acting as a fluid displacer is guided in the measuring cylinder, which, when pressed into the measuring cylinder, forces the fluid out of it, namely, into the cylinders fixed to the frame of the vehicle, and thus forces the pistons out against the action of their tension springs until they touch the springs of the vehicle.

The movement of the displacing piston is preferably effected by a self-locking gear, which prevents the displacer from returning, but a normal gear provided with a locking mechanism can also be used. In order to make the construction as compact as possible the displacer is preferably given the shape of an annular cylinder, in which the measuring piston, which is under pressure, is guided.

In the accompanying drawing an arrangement constructed according to the invention is shown, in which—

Fig. 1 shows diagrammatically a vehicle fitted with the arrangement.

Fig. 2 shows the measuring cylinder and

Fig. 3 the cylinder fixed to the vehicle frame with its piston which is operated by the vehicle spring.

Figs. 4, 6, 8 and 10 show the measuring cylinder in four different characteristic positions.

Figs. 5, 7, 9 and 11 shows the cylinder fixed to the vehicle frame with its piston in the positions corresponding to those of the measuring apparatus in Figs. 4, 6, 8 and 10.

Above the crown of each vehicle spring $f$ (Figs. 1, 3) a cylinder $p$ is fitted on the chassis C, in which a piston $q$ is guided, which is drawn into the cylinder by the tension springs $r$. The cylinder $p$ and the piston $q$ can only be located above the back springs or above the front springs. In another possible constructional form a single cylinder $p$ with a piston $q$ for the two back springs may be located in the centre of the vehicle, in which case the piston $q$ would be actuated by the axle of the vehicle.

Each cylinder $p$ (Figs. 1, 2) communicates through a fluid conveying pipe $c$ with the measuring cylinder $m$, which is located by the driver's seat. In this measuring cylinder $m$ an annular cylindrical displacer piston O is guided, which can be screwed down by means of a screw cap $u$ having a spare thread engaging in the thread on the flange of the measuring cylinder $m$. In the hollow cylindrical space of the piston O the measuring piston $n$ is guided, which is held in the bottom position shown in Fig. 2 by a spring R, which presses against the covering flange of the displacer O. The spring R is made of such strength that its pressure is considerably greater than the tension of all the springs $r$, which act against the pistons $q$ co-operating with the measuring cylinder.

Figure 8:
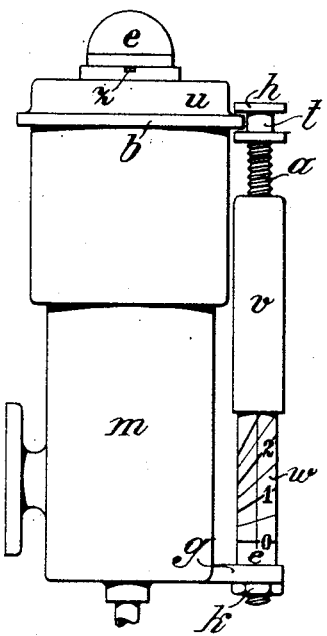

The measuring piston $n$ is provided, as stated above, with a curve scale, the divergent graduations O, 1, 2, 3 of which pass round about half of its cylindrical outer surface, while the horizontal zero line O of this scale coincides with the base of the piston head. On the upper edge of the neck of the displacer O (on which the head $e$ rests) there is a radial mark $z$ (Fig. 8).

On the outside of the screw cap $u$ there is a flange $b$, which engages in an annular groove $t$ of the head $h$ of a screw $a$, screwed into a sleeve $v$. The sleeve $v$ is guided on a vertical post $w$, which is fixed to the bottom flange $g$ of the measuring cylinder $m$ and is provided like the measuring piston with a curve scale O, 1, 2, 3, the horizontal zero line O of which lies slightly above the bottom flange $g$.

The manner in which the scale on the post $w$ is graduated and the object of this scale will be explained below.

The setting and functioning of the arrangement is as follows:—

In the inoperative position the members occupy the positions shown in Figs. 2 and 3, that is, the pistons $q$, which are located above the springs $f$ of the vehicle, are in the uppermost position shown in Fig. 3, that is, are withdrawn into their cylinders $p$, while the measuring piston $n$ is arranged within the displacer O. The head of the piston $q$ is at a distance $x$ from the centre of the upper surface of the spring $f$.

If the vehicle is to be loaded and the load is to be ascertained, the displacer piston O is forced before loading commences, into the measuring cylinder $m$ by screwing down the screw cap $u$, whereby the fluid in the measuring cylinder is forced through the pipes $c$ into the cylinder $p$ located above the springs $f$ of the vehicle, so that the pistons $q$ are forced out of their cylinders $p$ in opposition to the action of their tension springs $r$. The displacer O is forced down until all the pistons $q$ touch the vehicle springs $f$ cooperating with them. The measuring piston $n$, which is subject to the action of the spring R, remains stationary, because, as was stated above, the pressure of the spring R is considerably greater than the sum of the tensions of all the springs $r$ acting against the cooperating pistons $q$. The parts of the appliance will now be in the positions shown in Figs. 4 and 5.

On the vehicle being loaded, the pistons $q$ are forced into their cylinders $p$, displace the fluid in the latter through the pipes $c$ into the measuring cylinder $m$ and force the measuring piston $n$ in the stationary displacer O upwards against the action of the spring R. The parts of the arrangement are thus brought into the positions shown in Figs. 6 and 7 and the original distance $x$ (Fig. 5) between the centre of the inner surface of the spring and the head of the piston is reduced from $x$ to $x'$ (Fig. 7).

Since the linear decrease of the original distance $x$ to the valve $x'$ (Figs. 5 and 7) ($x-x'=d$) is proportional to the load, and the values $d$ are proportional to the upward thrust of the measuring piston $n$, the upward thrusts of the latter are proportional to the load.

The curve scale marked on the measuring piston $n$, which indicates whole tons or fractions of tons, must be adjusted when the device is mounted, that is, it must be ascertained along which vertical line to be marked on the measuring piston the readings on the curve scale should be taken. For this purpose the vehicle is loaded with a known weight, for instance, with 1 ton, and the measuring piston n turned until the graduation l cuts the mark z. Through that point of the graduation l, which coincides with the mark z, a vertical line i is then engraved on the measuring piston n, and the readings must be taken along this line until it is necessary to have a fresh test of the scale, which will become necessary owing to the springs becoming tired after a certain period. Figs. 6 and 7 show by way of example the position of the members, when the springs f of the vehicle, which co-operate with the measuring cylinder, have been loaded with 1.5 tons.

If the measuring appliance should be left in the position shown in Figs. 6 and 7, when driving, the strong dynamic blows caused by the load would soon make the correct functioning of the device doubtful.

Figure 9:
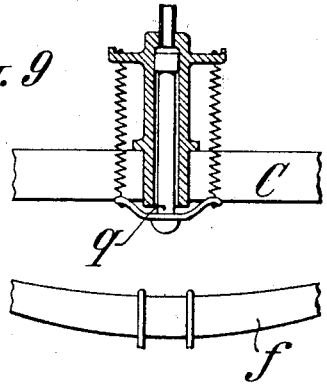

In order to protect the measuring device from the action of such blows, the screw cap u is screwed upwards after the loading is completed and before driving commences, until, owing to the fluid in the measuring cylinder m being entirely freed from the load, the tension springs r have forced the pistons q into their cylinders p and the measuring piston n has again completely entered the displacer O owing to the action of its spring R (see Figs. 8 and 9).

When the measuring appliance has been brought into this position, that is, when the measuring piston n has completely entered the displacer O, the load can no longer be checked by means of the appliances described hitherto, for the reading at the beginning of the drive on the scale i (Fig. 6) was taken on the assumption that the displacer O was in the position shown in Figs. 4 and 6, when loading was commenced, which position can no longer be ascertained when the displacer has been brought into the top position (Fig. 8). It would be possible to fix this position by scratching a mark, in the position shown in Fig. 6 on to the cylinder m below the bottom edge of the screw cap u. As, however, the initial positions of the displacer O (Fig. 4) or those of the screw cap u are subject to great variations, owing to the variations in the volume of the fluid, (losses, action of temperature), a new mark would have to be inscribed at the beginning of each drive. It would be just as impractical if a scale were marked on the cylinder m as in that case at the beginning of each drive a second number would have to be memorized, as well as the loading weight.

In order to solve the problem put forward in the simplest manner, the so-called checking apparatus is fitted to the measuring cylinder. This checking apparatus consists, as was described above, of the screw a, which engages with the flange b of the screw cap u, of the sleeve v, which is screwed on to the screw a, and of the vertical post w, which is fixed on the flange g and on which the sleeve v slides.

A curve scale showing weights is provided on the post w.

The zero line of this scale lies at the bottom of the scale and the mean unit of length is such that, in the case of vehicle springs of medium strength, it equals the linear difference of the paths, which the displacer O must pass through, in order, in the case of two loads differing by 1 ton, to force the pistons q out of their highest position until they touch the springs f of the vehicle.

For the requisite setting of the curve scale of the post w, when mounting the appliance, the apparatus is first brought, before the vehicle is loaded, into the positions shown in Figs. 4 and 5, that is, the screw cap is screwed down until the pistons q touch the tops of the springs, when the vehicle is in an unloaded state. The sleeve v is thereupon brought into such a position by turning it, that its lower edge coincides with the horizontal zero line O of the scale on the post w. The screw cap u is then screwed up again (the position shown in Fig. 2), and the vehicle is loaded with a known load, for instance 1.5 tons. The screw cap u is thereupon screwed down again (Figs. 10 and 11) until the pistons q touch the springs f of the vehicle, after which a fine vertical line e is engraved on the post w passing through the point of intersection of the graduation 1.5 with the lower edge of the sleeve v. The weight of a load can then be read off on this line e until fresh adjustment is necessary.

For obtaining exact records with the checking device as described it is necessary—before the beginning of loading, viz, after having brought the measuring apparatus in the position shown in Figs. 4 and 5—to adjust the sleeve v so that its lower edge coincides with the zero line of the scale e.

Figure 10:
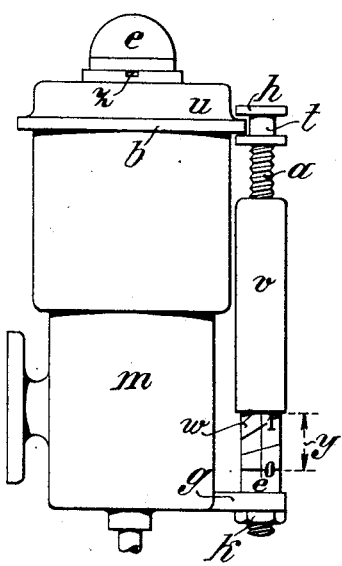
Figure 11:
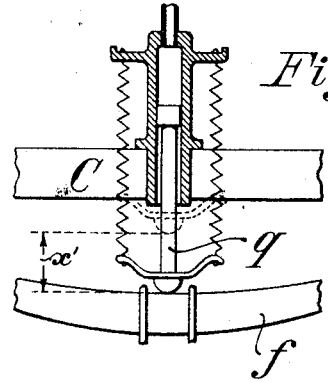

Thus, if during or at the end of a drive the weight of the load is to be ascertained, it is only necessary to screw down the screw cap u, which is in the top position shown in Fig. 8, until all the pistons q are again in contact with the springs f of the vehicle (Figs. 10 and 11). The intersection of the line e on the post w with the lower edge of the sleeve v will then give the weight of the load.

That this reading is correct will be seen from the following explanation:—

When the vehicle is not loaded the piston q must be lowered from its top position (Fig. 3), until it contacts with the spring of the vehicle, by the distance $x$ (Fig. 5), for which purpose the screw cap $u$ must be brought into the position shown in Fig. 4, during which operation the sleeve $v$ comes, according to what was stated above, to the zero line of the scale on the post $w$. When the wagon is loaded (Fig. 6 or 11) the piston $q$ must only be lowered through the distance $x'$, in order to touch the spring $f$ and the value $x-x'=d$ is thus proportional to the load according to what was stated above. The values $y$ (Fig. 10), which is the distance of the sleeve from the zero line O on the scale $w$, when the pistons $q$ were pressed down until they come in contact with the springs $f$ of the vehicle, with the vehicle in a loaded condition, that is, the readings on the scale on $w$ are proportional to the values $d=x-x'$; with $d=o$, $y$ also $\pm o$ and the greater the value of $d$ the greater will be the distance $y$ of the sleeve $v$ from the zero line, when the pistons $q$ are in contact with the springs of the vehicle.

As, however, the values $d$ are directly proportional to the loads and the values $y$ are directly proportional to the values $d$, it follows, that the values $y$, that is, the readings on the scale on $w$ are also directly proportional to the loads. The readings on the scale of the post $w$ thus also give the weights of the load at any time. In its nature the sleeve $v$ is nothing more nor less than an index member which is adjustable in height and is raised and lowered with the displacer O. The constructional form shown in the drawing, in which the sleeve $v$ is raised and lowered by the screw cap $u$, which performs the same movements as the displacer O, was chosen for the sole reason that it is constructionally more simple.

In place of the hydraulic transmission, mechanical transmission members can of course be used, such as levers, links, flexible and rigid shafts, cord driven gearing and the like.

Having now particularly described and ascertained the nature of said invention and in what manner the same is to be performed, we declare that what we claim is:—

1. In an appliance for measuring the useful load in spring vehicles, the combination with a vehicle spring, of a piston actuated by the same, a cylinder for said piston supported on the frame of the vehicle, a measuring cylinder, a measuring piston for the measuring cylinder provided with a weight scale, means operatively connecting said cylinders, whereby movement of the first mentioned piston by said spring will cause movement of the measuring piston, springs for normally drawing the first mentioned piston away from the vehicle spring, and a displacer piston for displacing the fluid contained in said measuring cylinder.

2. In an appliance for measuring the useful load in spring vehicles, the combination with a vehicle spring, of a piston actuated by the same, a cylinder for said piston supported on the frame of the vehicle, a measuring cylinder, a measuring piston for the measuring cylinder provided with a weight scale, means operatively connecting said cylinders whereby movement of the first mentioned piston by said spring will cause movement of the measuring piston, and an annular displacer piston for the displacement of the fluid in the measuring cylinder, said measuring cylinder being guided by said displacer piston.

3. In an appliance for measuring the useful load in spring vehicles, the combination with a vehicle spring, of a piston actuated by the same, a cylinder for said piston supported on the frame of the vehicle, a measuring cylinder, a measuring piston for the measuring cylinder provided with a weight scale, means operatively connecting said cylinders, whereby movement of the first mentioned piston by said spring will cause movement of the measuring piston, a displacer piston, and a self-locking mechanism for forcing said displacer piston into the measuring cylinder.

4. In an appliance for measuring the useful load in spring vehicles, the combination with a vehicle spring, of a piston actuated by the same, a cylinder for said piston supported on the frame of the vehicle, a measuring cylinder, a measuring piston for the measuring cylinder provided with a weight scale, means operatively connecting said cylinders, whereby movement of the first mentioned piston by said spring will cause movement of the measuring piston, a displacer piston cooperating with the measuring cylinder, an indicating member actuated by said displacer piston, a fixed weight scale cooperating with said indicating member, and means for adjusting said indicating member.

5. In an appliance for measuring the useful load in spring vehicles, the combination with a vehicle spring, of a piston actuated by the same, a cylinder for said piston supported on the frame of the vehicle, a measuring cylinder, a measuring piston for the measuring cylinder provided with a weight scale, means operatively connecting said cylinders, whereby movement of the first mentioned piston by said spring will cause movement of the measuring piston, a displacer piston formed by a cylindrical sleeve, an indicating member actuated by said displacer piston, and a fixed post provided with a weight scale and cooperating with said indicating member, said weight scale being provided with a zero line arranged at the bottom of the scale.

6. In an appliance for measuring the useful load in spring vehicles, the combination with a vehicle spring, of a piston actuated by the same, a cylinder for said piston supported on the frame of the vehicle, a measuring cylinder, a measuring piston for the measuring cylinder provided with a weight scale, means operatively connecting said cylinders, whereby movement of the first mentioned piston by said spring will cause movement of the measuring piston, a displacer piston arranged in the measuring cylinder, an indicating member actuated by said displacer piston, and a fixed weight scale cooperating with said indicating member, said weight scale of the measuring piston and said fixed scale being provided with curved graduations.

7. The combination with a vehicle spring member and a frame member, of a cylinder mounted on one of said members, a piston cooperating with said cylinder and arranged to be actuated by the other member, a measuring cylinder provided with a piston having a weight scale, and means operatively connecting said cylinders, whereby movement of said members towards one another will cause the first mentioned piston to enter its cylinder and the second mentioned piston to move out of its cylinder.

8. The combination with a vehicle spring member and a frame member, of a cylinder mounted on one of said members, a piston cooperating with said cylinder and arranged to be actuated by one of said members, a measuring cylinder, a pipe placing the interior of the measuring cylinder in communication with the interior of the first mentioned cylinder and adapted to convey fluid from one cylinder to the other, and a measuring piston arranged in the measuring cylinder and provided with a weight scale.

9. A combination as claimed in claim 8 in which a displacer piston is arranged in the measuring cylinder and surrounds said measuring piston.

10. A combination as claimed in claim 8 including auxiliary means for forcing the first mentioned piston into its cylinder.

11. A combination as claimed in claim 8 in which a displacer piston is arranged in the measuring cylinder and surrounds the measuring piston, an adjustable cap for the measuring cylinder engaging said displacer piston for forcing the same into the measuring cylinder, a spring arranged within the displacer piston for forcing the measuring piston into the displacer piston, other springs of less strength than the first mentioned spring for forcing the first mentioned piston into its cylinder, a fixed scale, an indicating member cooperating with the fixed scale, and adjustable means connecting said indicating member with said cap.

OSKAR SONNLECHNER.
J. SCHIDLOVSKY.